Patented Mar. 16, 1943

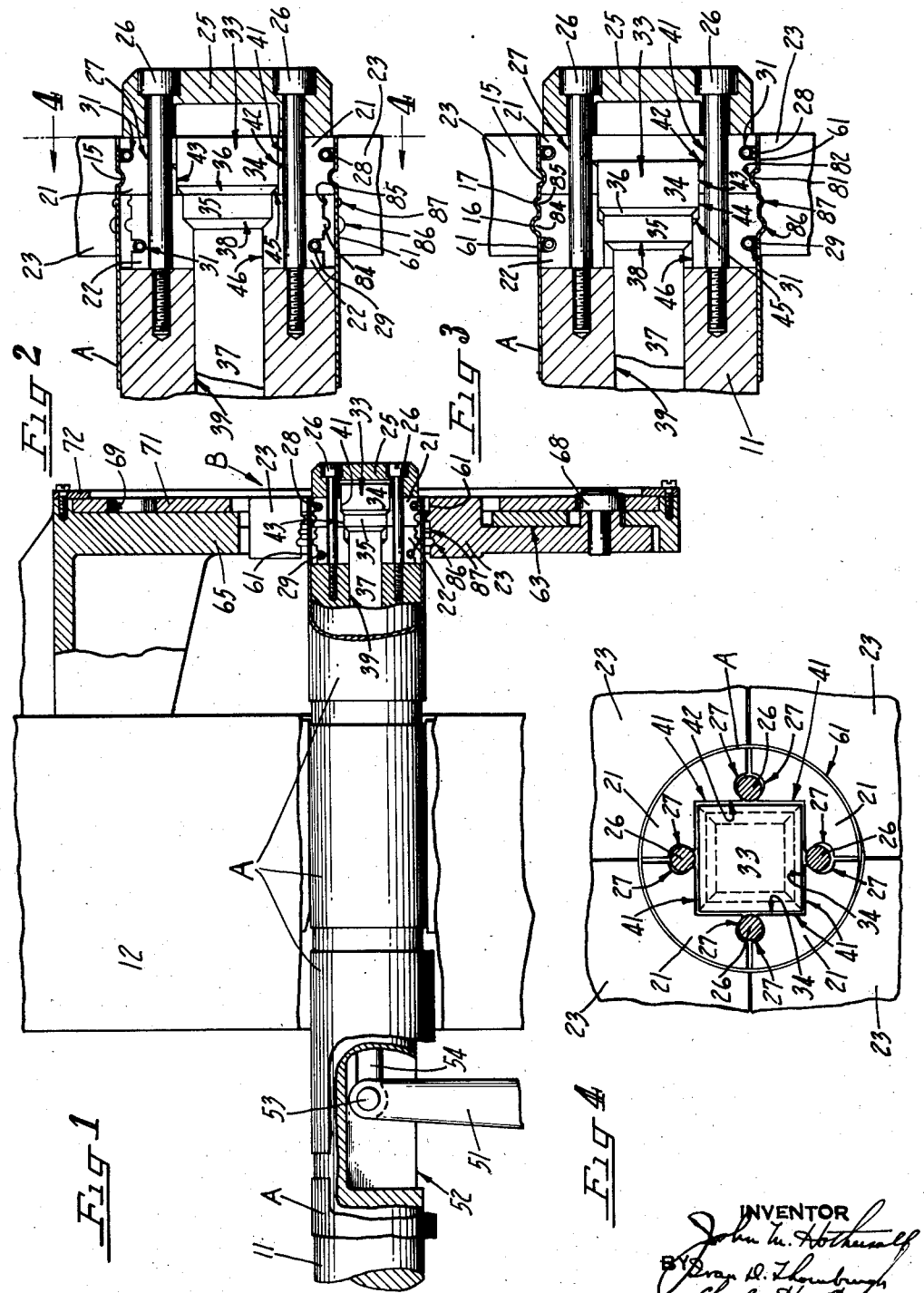

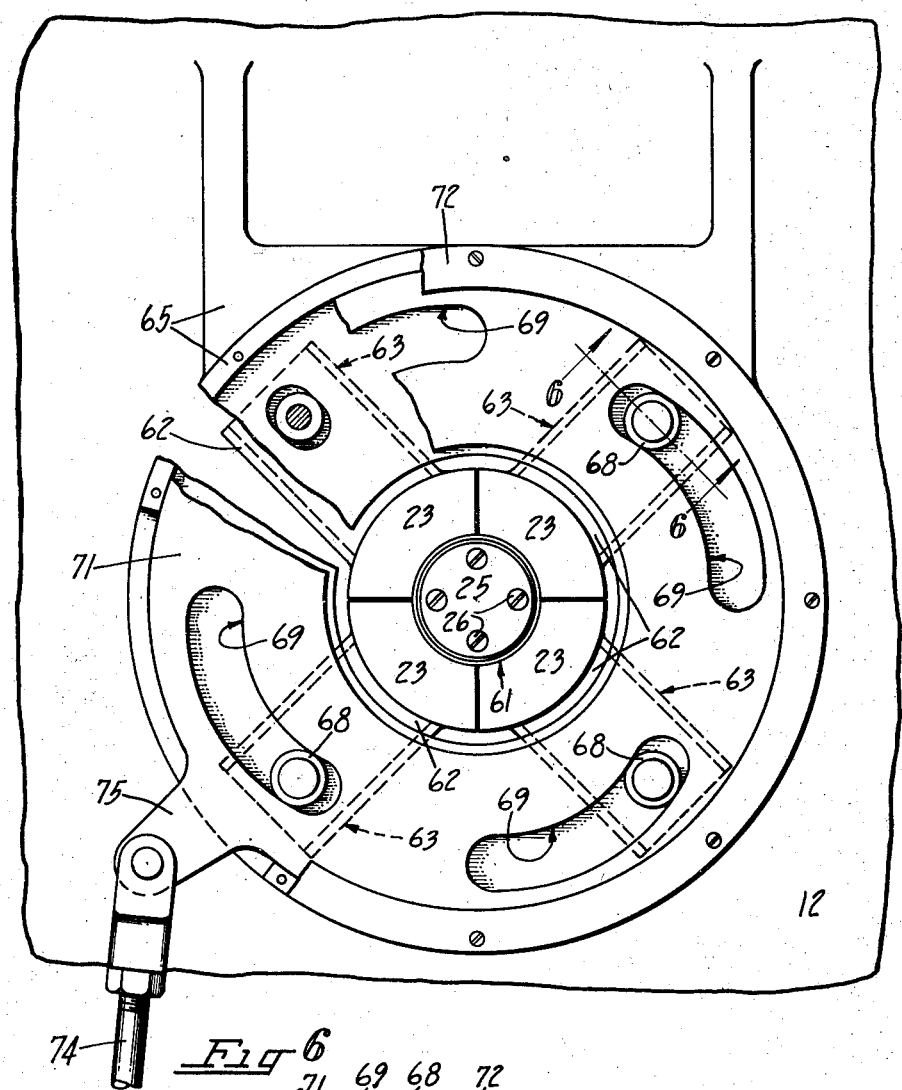

2,313,748

UNITED STATES PATENT OFFICE 2,313,748

CAN MAKING MACHINE

John M. Hothersall, Brooklyn, N. Y., assignor to American Can Company, New York, N. Y., a corporation of New Jersey Application May 21, 1940, Serial No. 336,454

5 Claims. (Cl. 153—48)

The present invention relates to container or can making machines and has particular reference to forming combination adjacent inside and outside beads or threads in a can part.

In the manufacture of can parts, such as can bodies, covers, collars, and the like the design of the part sometimes requires an inwardly extending bead adjacent an outwardly extending bead or a bead and thread combination disposed in opposite directions. Heretofore, the outwardly extending beads have been formed separately or as a distinct operation from the inner bead forming step.

The present invention contemplates an apparatus for forming such beads or threads in one operation.

An object therefore is the provision, in a can making machine, of beading devices which operate to form an inside bead and an outside bead in adjacent positions in the same can part and as one operation in a manner which permits of high speed production and which permits of drawing the beads without rupturing or otherwise damaging the can body.

Numerous other objects and advantages of the invention will be apparent as it is better understood from the following description, which, taken in connection with the accompanying drawings, discloses a preferred embodiment thereof.

Referring to the drawings:

Figure 1 is a longitudinal section through a beading station of a can making machine embodying the instant invention, with parts broken away;

Figs. 2 and 3 are enlarged sectional details of a portion of the beading station shown in Fig. 1, the view showing the movable parts in different positions, parts being broken away;

Fig. 4 is a transverse sectional view taken substantially along the line 4—4 in Fig. 2, with parts broken away;

Fig. 5 is a front elevation of the apparatus as viewed from the right in Fig. 1, with parts broken away; and Fig. 6 is a sectional detail taken substantially along the line 6—6 in Fig. 5.

As a preferred embodiment of the invention the drawings illustrate principal parts of a can body making machine of the character disclosed in my United States Patent 2,047,964, which issued July 21, 1936, on Electric welding. In such a machine flat sheet metal can body blanks are formed into cylindrical can bodies A having welded side seams. The forming of the can body and the welding of the side seam is preferably done on a horn or mandrel 11 (Fig. 1) which is carried in a machine main frame 12.

The instant invention is particularly directed to forming in a unitary operation an inside bead 15 (Fig. 3) an outside bead 16 closely adjacent thereto and an intermediate smaller outside bead 17, all in the can body while it is still on the mandrel 11. For this purpose there is provided a bead forming station B in the machine and such a station may follow and be closely adjacent to the side seam welding station, illustrated in the above mentioned patent.

The bead forming devices at the beading station B include a double set of inside beading or squeezer jaws 21, 22 (Figs. 1, 2, 3 and 4) and a single outside set of jaws 23. There are preferably four segmental shaped jaws in each set.

The inside jaws 21, 22 are disposed side by side within the periphery of the mandrel 11 and are retained against endwise displacement by an end cap 25. The cap is secured to the end of the mandrel by long bolts 26 which extend through grooves 27 formed in the side edges of the jaws and these bolts are threaded into the mandrel.

The inside jaws 21, 22 are retained against radial displacement by endless coiled springs 28, 29 which are wrapped around the jaws of each set. These springs normally hold the jaws together. The springs are seated in grooves 31 formed in the outer curved surfaces of the jaws. These springs hold the jaws in engagement with a longitudinally movable wedge plunger 33 which is located at the center of the mandrel.

The plunger 33 is preferably of square cross section and is formed with a double set of flat faced cam surfaces 34, 35. The plunger at the surfaces 35 is reduced in cross section so that such surfaces are spaced inwardly from the surfaces 34 being connected by beveled step walls 36. In a similar manner, the plunger adjacent the surfaces 35 is formed with a small cross sectional stem 37, the stem and the surfaces 35 being connected by bevel step sections 38. The stem 37 is carried in a slideway 39 formed inside the mandrel 11.

The cam surfaces 34, 35 and bevel step walls 36, 38 are adapted to cooperate with similarly formed cam surfaces on the jaws 21, 22. In shape, the jaw cam surfaces of each jaw are formed as inside right angle or corner sections, as shown in Fig. 4, which ride on the corners of the corresponding surfaces of the plunger. In other words, each jaw 21 adjacent its outer end is formed with a right angled cam surface 41 which extends along the inner corner face of the jaw inwardly for a longitudinal distance of about one half its extent and near the half point such a surface merges into a bevel wall 42 which in turn merges into a second or intermediate cam surface 43 which continues on to the inner end of the jaw.

Each of the jaws 22 is formed with intermediate cam surfaces 44 which in some positions of the jaws coincide with the cam surfaces 43 of the jaws 21. Cam surfaces 44 extend about one half the longitudinal extent of the jaws 22 and then merge into connecting bevel surfaces 45 which in turn merge into inner cam surfaces 46 also of inside corner form.

The normal position of the plunger 33 is as shown in Fig. 1. In this position its cam surfaces 34, 35 are in engagement with the four outer cam surfaces 41 and the four intermediate cam surfaces 43 of the jaws 21. In this same position of the plunger, the four inner cam surfaces of jaws 22 engage directly against the plunger stem 37. The springs 28, 29 press the jaws into this engagement. In this position of the jaws, their outer curved surfaces are within the periphery of the mandrel 11 and inside of a cam body A positioned thereon.

To perform the beading operation the plunger 33 is shifted toward the left, as viewed in Fig. 1, and this expands the beading jaws 21, 22. This movement of the plunger is brought about by an operating arm 51 (Fig. 1) which may be actuated in any suitable manner in time with the other moving parts of the machine proper. The arm extends up through an opening 52 in the mandrel and is connected by a pivot pin 53 to a link 54 which latter is connected at its opposite end with the plunger stem 37. The expanding of the jaws 21, 22 will be hereinafter explained in detail.

The outside jaws 23 hereinbefore mentioned, are disposed around the outside of the can body A as it rests on the mandrel 11. These outer jaws are formed with inner curved surfaces 61 (Figs. 1, 4 and 5) which during the beading operation engage against the body wall. These outer jaws are formed on the inner ends of radial slides 62 (Fig. 5) which are carried in slideways 63 formed in a head bracket 65. There are four such slides which surround the mandrel and which are secured to the machine frame 12. Gibs 66 (Fig. 6) secured to the head bracket 65, retain the slides against displacement.

Each slide 62 (Figs. 1 and 2) carries a cam roller 68. The four cam rollers operate in cam slots 69 formed in a rotatable or oscillatory plate 71 carried on the head bracket 65. A circular guide ring 72 is secured in the bracket and keeps the plate 71 in the head bracket 65. There is one cam slot 69 for each slide 62 and one end of each slot is closer to the center of the plate than the other end to produce the desired cam effect. The plate 71 is periodically rocked or oscillated in its guide ring by way of a link 74 which is connected to a lug 75 projecting outwardly from and formed on the plate. The link may be actuated in any suitable manner in time with the other moving parts of the machine.

When the plate 71 rotates or is turned in a clockwise direction as viewed in Fig. 5 the cam slots 69 shift the cam rollers 68 and draw the slides 62 inwardly. This moves the jaws 23 toward the mandrel 11, as shown in Fig. 5. When the plate rotates or is turned in the opposite or counter-clockwise direction the slides are moved outwardly and the jaws are thus separated from the mandrel. This outward position is the normal position of the outside jaws. In this manner, the outside jaws 23 are made to cooperate with the inside jaws 21, 22 in performing the can body beading operation which will now be explained in some detail.

In the can body A the inside bead 15 is preferably formed first. For this purpose, the jaw expanding plunger 33 as it moves inwardly (toward the left, Fig. 1) moves its inclined cam surfaces 36 against the inclined surfaces 42 of the inside jaws 21 thus bringing the cam surfaces 34 of the plunger inside of the intermediate cam surfaces 43 of the jaws 21, as shown in Fig. 2. This action expands the jaws 21 and thus brings their outer surface into engagement with the inside surface of the can body A.

During this expanding movement of the inside jaws 21, the outside jaws 23 are moving in toward the can body. In point of time just after the inside jaws 21 make contact with the can body and while the plunger is still moving, the outside jaws 23 engage the outside wall of the body. In reaching this engagement an outwardly extending bead section 81 on the curved faces 61 of each of the outside jaws 23 is first brought against the body and then the several bead sections press the body wall inwardly into a cooperating bead groove 82 formed in the outer curved faces of the inside jaws 21. It is this action that produces the inside bead 15 and the metal of the body used in producing the bead is drawn partially from the portion of the body at the right, as viewed in Figs. 1 and 2. This may be termed the first part of the beading operation.

With the inside bead 15 thus formed, the inside jaws 21 and the outside jaws 23 remain in position and hold the can body against any endwise movement for the next step of beading. The jaw expanding plunger 33 continues to move inwardly from the position of Fig. 2 and the inclined cam surfaces 38 of the plunger ride against the corresponding cam surfaces 45 of the inside jaws 22 and this brings the cam surfaces 35 of the plunger inside of the inner cam surfaces 46 of the jaws 22. This action expands the jaws 22 outwardly against the can body, the parts now being in the position shown in Fig. 3.

The outward movement of the jaws 22 first brings a pair of outwardly extending bead sections 84, 85 formed on each jaw 22, into engagement with the can body wall and then forces the engaged wall part outwardly into cooperating bead grooves 86, 87 formed in the curved surfaces 61 of the outside jaws 23. This action forms the outside beads 16, 17, the metal of the body for these beads being drawn for the most part from the adjacent unclamped portions of the can body.

Forming of the outside beads 16, 17 completes the bead forming operation whereupon the plunger 33 begins its return to the normal position shown in Fig. 1. As the various cam surfaces become disengaged, the springs 28, 29 contract the inside jaws 21, 22 bringing them to their normal positions, while disengaging their bead sections and grooves from the bead sections and grooves of the outside jaws 23. At the same time the outside jaws 23 are drawn away from the beaded can body as hereinbefore mentioned. The body thus clear of the jaws may be removed from the mandrel 11 for further operations.

Thus both inside and outside beads are formed adjacent each other in the same can body and in one beading operation and in a manner which permits of high speed production. This being easy working of the metal such action permits drawing of the stock of the can body without rupturing it in any way.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A bead forming device for a can body making machine, which comprises a mandrel for supporting a can body, a plurality of peripherally disposed segmental outside squeezer jaws surrounding said mandrel, rotary means for actuating said squeezer jaws, a double set of peripherally disposed segmental inside squeezer jaws located in contiguous relation within said mandrel, and means for first expanding one set of said inside squeezer jaws simultaneously with inward movement of said outside squeezer jaws for producing a bead section in said can body and for clamping said body against movement, said means further actuating the other set of said inside squeezer jaws in cooperation with said outside jaws for producing a second bead section in said can body closely adjacent said first bead section.

2. A bead forming device for a can body making machine, which comprises a mandrel for supporting a can body, a plurality of peripherally disposed segmental outside squeezer jaws surrounding said mandrel, rotary means for actuating said squeezer jaws, a double set of peripherally disposed segmental expansible inside squeezer jaws located in contiguous relation within said mandrel, said inside squeezer jaws having cam surfaces formed on the inner edge thereof, and an expander plunger engageable against said cam surfaces for first actuating one set of inside squeezer jaws in cooperation with inward movement of said outside squeezer jaws for producing a bead section in said can body and for holding said body against movement, said means being further operative immediately thereafter to actuate the remaining set of inside squeezer jaws in cooperation with said outside jaws for producing a second bead section in said can body closely adjacent said first bead section.

3. A bead forming device for a can body making machine, which comprises a mandrel for supporting a can body, a set of segmental outside squeezer jaws surrounding said mandrel, each having a bead forming projection and a closely disposed bead forming groove, an oscillatory plate cooperating with said outside squeezer jaws to move the same inwardly into engagement with the can outside body on said mandrel, two sets of expandible inside squeezer jaws located in contiguous relation within said mandrel, one set of said inside jaws having a bead forming groove formed in its outer edges and a stepped cam surface formed on its inner edges, the remaining set of said inside jaws having a bead forming projection formed on its outer surfaces and a stepped cam surface on its inner edges, an expander plunger disposed in said mandrel within said inside jaws, said plunger having closely spaced wedge cam surfaces thereon, and means for shifting said plunger through an expanding stroke and a return stroke, the cam surfaces of said plunger when moving through an expanding stroke successively expanding said sets of inside jaws in cooperation with said outside jaws for producing an inside bead section and an outside bead section in said can body and when moving through a return stroke permitting said inside jaws to contract, and means for contracting said inside jaws so that the beaded can body may be removed from said mandrel.

4. A bead forming device for a can body making machine, comprising a mandrel for interiorly supporting a tubular can body, a plurality of inner and outer peripherally disposed segmental beading instrumentalities located respectively inside and outside of said can body, said inner beading instrumentalities comprising a pair of separate closely juxtaposed elements, and means for moving said outer and one of said inner beading instrumentalities into engagement with the can body on opposite sides thereof to form a bead therein while drawing the body material inwardly from one end thereof, said means thereafter moving the other of said inner beading instrumentalities relative to and while maintaining said outer beading instrumentality in clamping engagement with said formed bead, whereby to form a succeeding bead in the body closely adjacent said first mentioned bead and while drawing the body material inwardly from the other end thereof, and to avoid undue stretching and weakening of the can body between closely adjacent beads.

5. A bead forming device for a can body making machine, comprising a mandrel for interiorly supporting a tubular can body, a plurality of inwardly movable segmental outside beading instrumentalities arranged to encircle said supported can body and operable from the exterior thereof, a pair of peripherally disposed movable segmental inside beading instrumentalities disposed in contiguous relation inside said supported can body and successively operable against the inside of the body in cooperation with said inwardly movable outside beading instrumentalities, and means for moving said outside and one of said inside beading instrumentalities into engagement with the can body on opposite sides thereof to form a bead therein while drawing parts of said body material inwardly from one end thereof, said means thereafter moving the other of said inside beading instrumentalities relative to and while maintaining said outside beading instrumentality in clamping engagement with said formed bead, whereby to form a succeeding bead in the can body in closely adjacent relation to said first mentioned bead while drawing all of the body material for said succeeding bead inwardly from the opposite portion of the can body, and to avoid undue stretching and weakening of the can body between closely adjacent beads.

JOHN M. HOTHERSALL.